Dec. 10, 1963     V. F. VOLKOVITSKY     3,113,653
APPARATUS FOR FREEING A JAMMED PRESS RAM
Filed Sept. 16, 1960
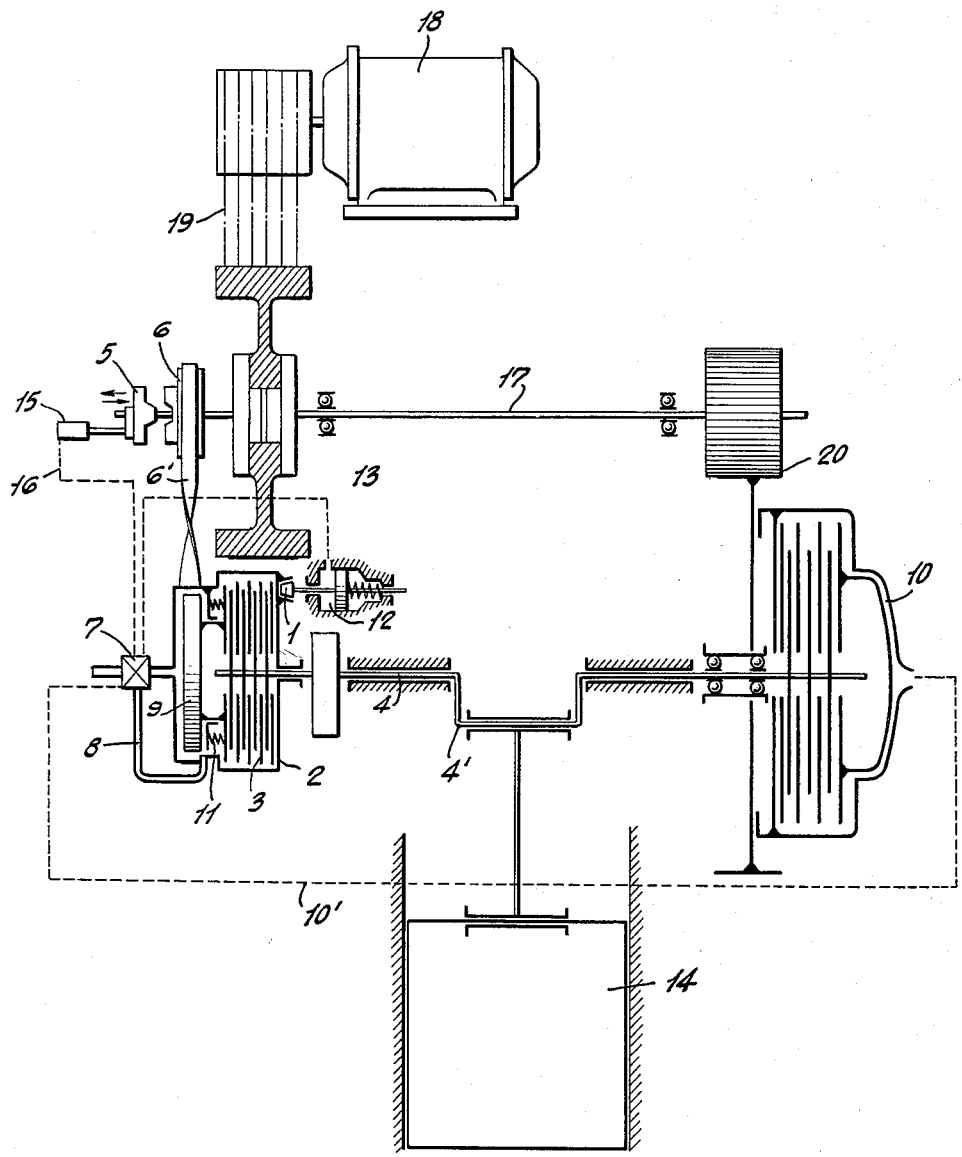
INVENTOR
VALENTIN F. VOLKOVITSKY
BY *Glascock, Downing & Seebold*
ATTORNEYS

United States Patent Office 3,113,653
Patented Dec. 10, 1963

3,113,653
APPARATUS FOR FREEING A JAMMED
PRESS RAM
Valentin Feodorovich Volkovitsky, Tsvetnoi Blvd. 16/I,
Apt. I, Moscow, U.S.S.R.
Filed Sept. 16, 1960, Ser. No. 57,867
1 Claim. (Cl. 192—14)

The present invention relates to an apparatus for freeing the ram of a crank press which has becomed jammed.

It is known that the jamming of a crank press, e.g. hot-stamping press, during operation causes serious problems. For the purpose of freeing the press different wedge devices are employed. This necessitates the application of considerable stresses and results in disturbance of reciprocal disposition of the press stamp upper and bottom parts. It is possible to increase the friction clutch torque by means of a higher air pressure supply, but this requires increasing of strength of the clutch details and enlargement of its overall dimensions.

The present apparatus for freeing a crank press that has become jammed includes a combination clutch and brake device installed on the crank shaft driven by the main clutch and eliminates the above mentioned shortcomings and permits restoration of the press operation without derangement of the parts. For this purpose a supplementary moment of rotation is given to the crankshaft taken from a spare drive coupled to the brake and clutch device.

A disc friction clutch is used as the combination clutch and brake device.

The single FIGURE of the drawing shows diagrammatically an apparatus constructed in accordance with this invention and also shows in broken lines the piping arrangement between the various pneumatically operated devices which constitute a part of the control system.

When the press is operating normally, the stop 1 holds the member 2 of the combination disc friction clutch and brake 3, installed on the crankshaft 4 in a fixed state at one side of the crank 4', the dog clutch 5 being disengaged by a cylinder and piston 15 connected to air distribution fitting 7 by pipe 16 and the belt pulley 6 of the crossed belt transmission 6', free on the drive shaft 17, being motionless as well. The drive shaft 17 is driven by a motor 18 through a suitable power transmission 19 and the drive shaft 17 is connected to the driving element of the main clutch 10 through gearing or other suitable means 20.

When the press is performing the working stroke, air is supplied from the distribution fitting 7 through the pipeline 8 into annular recess in the combination disc friction clutch and brake 3, and the piston 9 moves away releasing the discs of the clutch and brake 3. Air is then supplied from the fitting 7 through pipe 10' into the recess of the main clutch 10 for the purpose of engaging the driven and driving elements of the main clutch 10 and driving the press ram 14. When the press ram 14 is returned to the extreme upper position, the main clutch 10 is disengaged and the combination disc clutch and brake 3 is engaged by exhausting the air from the annular recess therein, which causes the discs to engage by the action of springs 11 and to provide crankshaft braking. The driven element of the main clutch 10 is fixed to the crankshaft 4 at the side of the crank 4' opposite the combination clutch and brake 3.

In the case of jamming of the press ram 14, the stop 1, holding the member 2 of the clutch and brake 3, is withdrawn from the member 2 by means of a pneumatic cylinder 12 connected to fitting 7 by pipe 13, and the combination clutch and brake 3, operates as a supplementary clutch. Simultaneous engagement of the main clutch 10, the dog clutch 5 and the combination clutch and brake 3 operates to apply torque to the shaft 4 on opposite sides of the crank 4' and the resulting increased torque serves to free the press ram. The control system, including the distribution fitting 7, pipes 8, 10', 13 and 16, cylinders 12 and 15 and the air chambers of the clutch and brake 3 and the main clutch 10 is provided with suitable conventional valves, not shown, for controlling the operation thereof.

Arrangement of the said main clutch 10 and the combination clutch and brake 3 on the opposite ends of the crankshaft 4 allows the application of approximately twice as much torque as is applied to the main clutch 10 without a noticeable overload.

It will be obvious to those skilled in the art that various changes may be made in the invention without departing from the spirit and scope thereof and therefore the invention is not limited by that which is shown in the drawing and described in the specification, but only as indicated in the appended claim.

I claim:

A press comprising a frame, a press ram slidably mounted in said frame, a crankshaft having a crank intermediate the length thereof and rotatably mounted in said frame, a connecting rod connecting said ram and said crank, whereby rotation of said crankshaft will operate to reciprocate said ram, a main drive clutch having driven element being fixed to said crankshaft at one side of said crank, a drive shaft rotatably mounted in said frame, a driving connection between said drive shaft and said driving element, means to drive said drive shaft for driving said crankshaft and ram through said main clutch for normal operation of said press, a combination secondary clutch and brake having a first member fixed to said crankshaft at the opposite side of said crank and a second member, means to move said second member into and out of engagement with said first member, releasable stop means mounted on said frame and engageable with said second member to prevent rotation thereof, whereby upon engagement of said stop means with said second member and engagement of said second member with said first member said combined secondary clutch and brake will operate as a brake to prevent rotation of said crankshaft, a driving member freely rotatable on said drive shaft, a third clutch means for coupling said drive shaft to said driving member to drive the same, a driving connection between said driving member and the second member of said combination secondary clutch and brake and control means for simultaneously releasing said stop means, engaging said first and second members and actuating said third clutch means to cause said secondary clutch and brake to operate as a clutch and for engaging the elements of said main clutch, whereby in the event of jamming of said ram torque may be applied simultaneously in the same direction to said crankshaft at opposite sides of said crank to free said ram.

References Cited in the file of this patent

UNITED STATES PATENTS

| 2,532,320 | Maussnest | Dec. 5, 1950 |
| 2,577,641 | Wissman | Dec. 4, 1951 |

OTHER REFERENCES

Anmelder, German application 1,046,501 printed December 11, 1958, (Kl. 58 b 16), 2 pages spec., 1 sheet dwg., 100–282.